Oct. 20, 1942.   P. H. LAIR   2,299,154
REFRACTORY ASSEMBLY FOR HEATING PLANTS
Filed Dec. 12, 1939
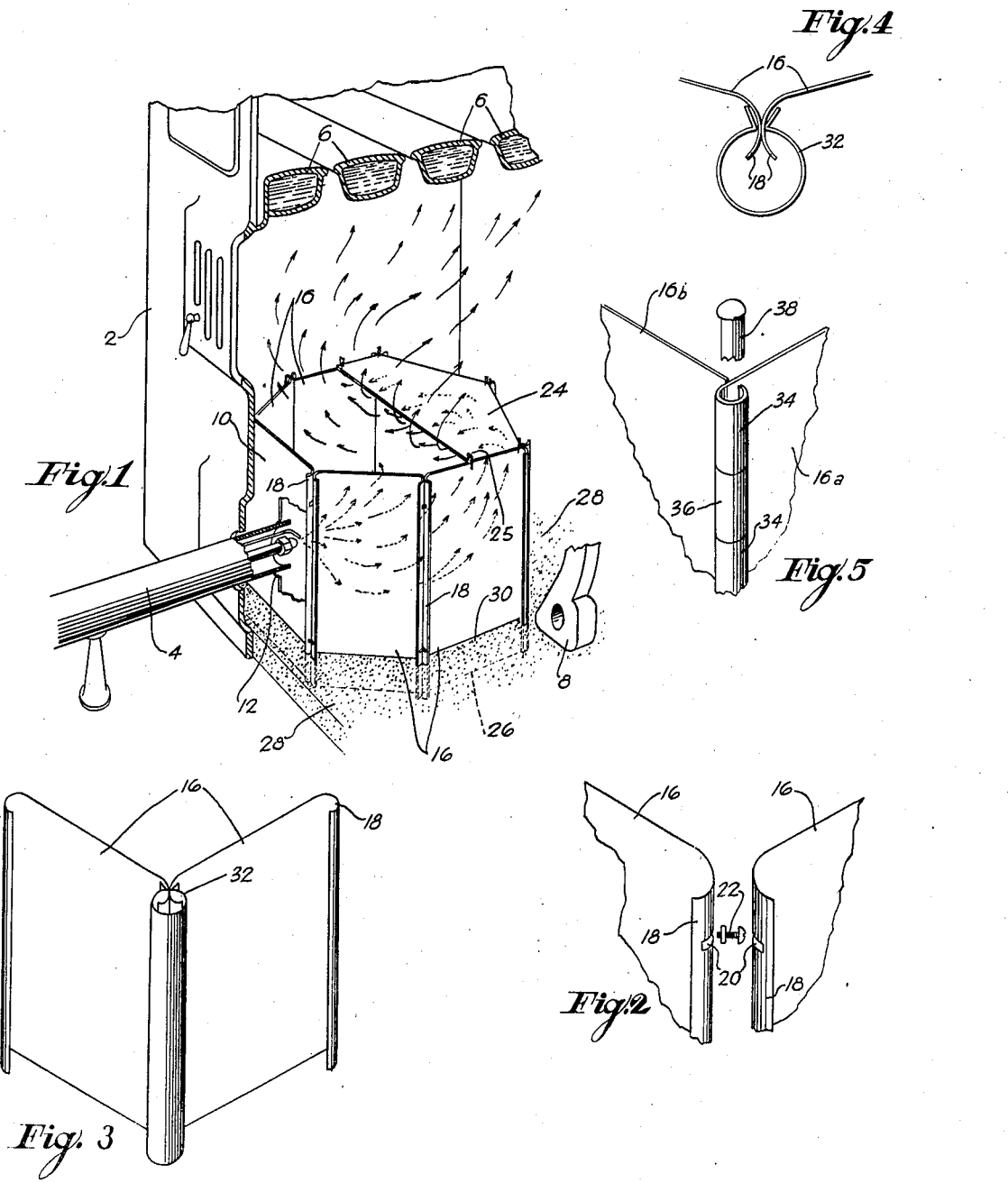
INVENTOR
Paul H. Lair
by Frederick C. Engel
ATTORNEY Patented Oct. 20, 1942

2,299,154

UNITED STATES PATENT OFFICE 2,299,154

REFRACTORY ASSEMBLY FOR HEATING PLANTS

Paul Henry Lair, Newton, Mass.

Application December 12, 1939, Serial No. 308,784

11 Claims. (Cl. 158—1)

This invention relates to heating plants and is particularly concerned with improvements in combustion chambers for oil-burning heating plants. It is to be understood, however, that the invention, in certain respects, is not limited to oil-burning heating plants but is applicable to heating plants of all kinds, regardless of the heat-transferring medium used, be it water, steam, or air.

Oil-burning heating plants are customarily provided with a combustion chamber in which the combustion of the fuel mixture takes place and from which the heat thus produced is dissipated and transmitted to a water-backed boiler surface or its equivalent. Usually, the combustion chamber in a heating plant is constructed piece-meal of fire-bricks which are separately and individually placed into the heating plant, adjusted in proper position and secured in place. While combustion chambers thus constructed have found widespread use, obvious disadvantages inherent in them are their cumbersome and time-consuming, and hence expensive, manner of construction and installation, as well as the reduction in efficiency of the boiler, particularly when the latter is converted from coal or coke fuel to oil. In such cases, the reduced efficiency is the necessary result of the fact, among others, that the combustion chamber, which must be of a certain minimum height in order to be effective, as a rule covers a substantial portion of the water-backed boiler surface, particularly the so-called water-legs extending toward the bottom of the boiler.

Moreover, it has been observed that unless the most expensive, high-temperature-resisting brick is used in the construction of refractory combustion chambers, the alternate firing and cooling of the heating plant gradually cause the brick to disintegrate, with the resultant necessity of repair or total replacement.

It is, therefore, an object of the invention to improve combustion chambers for heating plants so as to increase the efficiency of such plants. Another object of the invention is to increase the heat-resisting qualities of such combustion chambers, and to facilitate and greatly accelerate their construction and installation in the said heating plants.

To these ends, and in accordance with one feature of the invention, the illustrated combustion chamber comprises sections of a refractory material, the said sections being joined, prior to the installation of the combustion chamber in the heating plant, to form a collapsible unit or assembly which, preferably as a whole, is passed into and set up in the interior of the heating plant. The refractory sections are joined for independent movement and adjustment relatively to each other so that the assembly may be easily collapsed for the purpose of less bulky and easier transportation as well as for the purpose of readily passing it into the heating plant through the door of the fire box. Moreover, by reason of the adjustability of the said sections, the assembly may be set up in the boiler and adjusted so as to assume any desired shape.

In accordance with another important feature of the invention, the said sections of the combustion chamber are made of a refractory metal, stainless steel having been found to be particularly suitable for the present purpose.

Among the principal and outstanding advantages of a combustion chamber constructed and arranged as well as installed in accordance with the present invention the following are particularly noted. The refractory sections of the combustion chamber constructed in accordance with the present invention are considerably lighter in weight than the commonly used fire-brick and hence are easier and less expensive to transport to the place of installation. Because of their relatively light weight and their design, the said refractory sections may be brought manually to the heating plant, assembled outside of the boiler without the use of special tools, collapsed, passed through the fire door into the boiler, and set up therein in any suitable shape, all this consuming only a very small fraction of the time hitherto required for installing a fire-brick combustion chamber. After installation, the combustion chamber constructed and arranged in accordance with the present invention is ready for immediate use, whereas combustion chambers constructed of fire-brick, as heretofore, require two to four hours to dry before they can be used. Loss of efficiency of the boiler up to 30% was entailed heretofore by the necessity of constructing the combustion chamber sufficiently high to obtain the required volume and filling the space between combustion chamber and boiler wall with a suitable insulating material thereby covering part of the water-backed boiler surface. By the use of the metal refractory of this invention, it will be necessary to apply insulating material only to the level of the lower end of the water-backed boiler surface, thus permitting heat transmission to the entire water-backed boiler surface.

The above and other features of the invention, including various novel details of construction and combinations of parts, will now be more particularly described with reference to the accompanying drawing and pointed out in the claims.

In the drawing,

Fig. 1 is a perspective view of part of an oil-burning heating plant with the present invention embodied therein, parts of the structure being broken away;

Fig. 2 is a detail view of part of the combustion chamber illustrated in Fig. 1, showing particularly parts of two combustion chamber sections and the means for joining them;

Fig. 3 illustrates modified means for joining the sections of the combustion chamber;

Fig. 4 is a top view of two sections joined by the means illustrated in Fig. 3; and Fig. 5 illustrates still further modified means for joining the sections.

The heating plant in which the invention is herein shown as embodied is indicated generally at 2 (Fig. 1), the plant being designed for domestic use and being fired by an oil burner, the draft tube of which is indicated at 4.

The water-backed surface of the interior of the heating plant includes water tubes 6 and downwardly extending members 8 commonly called "water-legs," a broken off part of a water-leg 8 being shown in Fig. 1. When converting a coal- or coke-fired heating plant to an oil-burning plant by the installation therein of an oil burner, it is necessary to construct in the interior of the heating plant a combustion chamber in which the combustion of the fuel mixture is caused to take place and from which the ensuing heat is dissipated and transmitted to the water-backed surface in the interior of the heating plant.

The illustrated combustion chamber constructed and arranged in accordance with the present invention is a unit or assembly which may be pre-assembled prior to its installation in a heating plant. It comprises a face plate 10 having a central aperture 12 adapted to receive the draft tube 4 of the oil burner, the tube housing an oil spray nozzle and ignition points for igniting the fuel mixture upon starting the operation of the heating plant. Preferably, the face plate 10 is made of a refractory metal such as stainless steel. Tests made under actual operating conditions have shown conclusively and convincingly that stainless steel is a material that not only lends itself excellently to the present purpose but tends to increase substantially the efficiency of the combustion chamber and, hence, of the heating plant as compared with combustion chambers constructed of fire-brick. Attached to the face plate 10 is a series of smaller plate-like sections 16 also made of a refractory metal such as stainless steel. The face plate 10 as well as the sections 16 are curved at their vertical margins so as to provide flanges 18 (Fig. 2). Near the upper and lower extremities of the flanges 18 there are provided therein slots 20 preferably extending in a horizontal direction. In assembling the combustion chamber, that is in attaching the sections 16 to each other and to the face plate, the flanges 18 of adjacent sections are brought into abutting relation and are secured together by passing screws 22 (Fig. 2) through the slots, the screws being secured in place by nuts. By reason of these screw-and-slot connections between the various sections 16 as well as between them and the face plate 10, a certain play or movement between the said sections 16 and face plate 10 is possible, permitting each section 16 to be readily moved or adjusted relatively to the other sections 16.

A refractory metal baffle plate 24, which is disposed substantially in a horizontal plane, is supported on the upper extremities of certain of the sections 16. Preferably, and as illustrated in Fig. 1, the baffle plate 24 rests on the upper ends of the sections located diametrically opposite to the face plate 10. While the baffle plate 24 may rest loosely upon the sections 16, it is preferred to attach the baffle plate to the sections by suitable means such as wire staples 25, clips, or the like.

Moreover, it is preferred to set up this refractory unit on a base plate which is indicated at 26 in Fig. 1, the base plate also being made of a refractory metal such as stainless steel. After the installation of the refractory assembly 10, 16, a filler 28, usually a rock wool composition, is applied, for the purpose of insulating the bottom portion of the boiler, between the installed refractory assembly and the inside wall of the boiler, the upper level of the filler being indicated at 30 in Fig. 1. This level coincides with the horizontal plane through the lower extremity of each water-leg 8, thus leaving the entire lengths of the water-legs fully exposed to the heat created in the combustion chamber.

Instead of employing the screw-and-slot connection illustrated in Fig. 2 for joining the sections 16 of the refractory assembly, other suitable means may be used for joining the sections while permitting movement or adjustment of each section relatively to the other sections. Figs. 3 and 4 illustrate a modified means for joining the curved marginal portions or flanges of the refractory sections. In this case, the curved flanges 18 of the sections 16 as well as of the face plate 10 are held in abutting relation by refractory metal spring clips 32 which may extend the entire length of the sections 16 or may be considerably shorter. Fig. 4 illustrates such a joint in plan view.

Another means for joining the sections 16 to each other as well as to the face plate 10 is illustrated in Fig. 5 of the drawing. Here, the joint is in the form of a hinge. The section 16a in Fig. 5 is provided with a series of marginal hinge sections 34 and the section 16b with a series of marginal hinge sections 36 (only one being shown). The hinge sections 34 and 36, being placed in juxta-position, are held together by a hinge pin 38 passed through them.

Other equally expedient and convenient means for and methods of joining the various parts of the refractory assembly are possible and are believed to come within the broad scope of this invention.

As previously stated, the refractory unit or assembly composed of the face plate 10 and the sections 16 is preassembled before the unit is installed in the heating plant to form a combustion chamber therein. As will be readily seen, the size, particularly the circumferential dimensions, of the combustion chamber depends on the size of the interior of the heating plant and the space or volume required to cause a complete combustion of the fuel mixture. By selecting a suitable and predetermined number of sections 16 to be secured to each other and to the face plate 10, refractory units or assemblies of any desired circumferential dimension may be readily constructed. After the assembly of the refractory unit by the joining of the sections 16 to each other as well as to the face plate 10 by any of the means herein shown and described, the unit, by reason of the provision for movement between the various sections as well as the face plate, may be collapsed to form a compact member which can be easily transported and handled. Moreover, the collapsed assembly can readily be passed through the fire door of the heating plant and set up in the heating plant. In setting up the assembly in the heating plant, the face plate 10 is placed over the draft tube 14 of the oil burner, the draft tube preferably protruding somewhat through the aperture 12 of the face plate 10 into the interior of the assembly. The collapsed assembly can now be easily opened and the individual sections 16 can be readily adjusted, preferably in accordance with the shape and configuration of the interior of the heating plant, to form a combustion chamber of the desired dimensions and shape. As stated, the assembly is preferably set up on a bottom plate 26 previously placed horizontally in the bottom of the fire box. After the setting-up and adjusting operations just described, the baffle plate 24 is placed upon the sections 16 diametrically opposite the face plate 10 and preferably is secured thereto by suitable means such as staples 25 or the like. Thereafter, a suitable filler of insulating material 28 is applied between the set-up combustion chamber and the inner wall of the heating plant up to the line 30 indicated in Fig. 1.

As actual tests have shown, the efficiency of any heating plant in which a combustion chamber constructed and arranged in accordance with this invention is installed, is substantially improved, including heating plants already provided with combustion chambers constructed of firebricks. The refractory metal baffle plate 24 assists materially in increasing the efficiency of the heating plant in that it deflects the flame and the resultant current of hot air as indicated by arrows in Fig. 1, thereby preventing excessive heat losses heretofore caused by the flame and the current of hot air produced being directed almost in a straight line from their source to the flue pipe or stack.

Having thus described my invention, what I claim as new and desire to secure by Letters Patent of the United States is:

1. A heating plant combustion chamber adapted to withstand high combustion temperatures, comprising sections composed of a refractory metal, and means for so joining the said sections for independent movement relatively to each other as to permit adjustment of the chamber after assembly and installation in a heating plant as well as removal of the chamber as an unmutilated unit from the plant.

2. A heating plant combustion chamber adapted to withstand high combustion temperatures, comprising individual plate-like members composed of a refractory metal, and means for so joining the said members for independent movement relatively to each other as to permit adjustment of the chamber after assembly and installation in a heating plant as well as removal of the chamber as an unmutilated unit from the plant.

3. A heating plant combustion chamber adapted to withstand high combustion temperatures, comprising a refractory metal face plate, refractory metal sections, and means for so joining the said sections to each other and to the said face plate as to permit adjustment of the chamber after assembly and installation in a heating plant as well as removal of the chamber as an unmutilated unit from the plant.

4. A refractory member for a heating plant, comprising flanged refractory metal plates provided with slots in their flanged portions, the flanged portions of two adjacent plates being so held in abutting relation by screws extending through said slots and secured in place by nuts as to permit relative movement of the metal plates and adjustment of the refractory member after assembly and installation in the heating plant as well as removal of the chamber as an unmutilated unit from the plant.

5. A combustion chamber for a heating plant, having in combination refractory metal plates joined in edgewise relation, flanges on the lateral edges of said plates, screws extending through slots in said flanges for holding the flanged portions of adjacent plates in abutting relation, and nuts for holding said screws in place with sufficient play to permit movement of each plate relatively to the other plates and thereby to permit adjustment of the chamber after assembly and installation in the heating plant as well as removal of the chamber as an unmutilated unit from the plant.

6. In an oil-burning heating plant, a combustion chamber, comprising a refractory metal face plate apertured to receive the draft tube of an oil burner, flanges at each lateral edge of said face plate, a series of refractory metal plates arranged in edgewise relation and secured to the said face plate, flanges at each lateral edge of each of the said refractory metal plates, and screws extending through slots provided in the abutting flanges of adjacent refractroy metal plates to hold the said plates in abutting relation while permitting adjustment thereof at any time.

7. In a heating plant, a combustion chamber adapted to withstand high combustion temperatures, the chamber comprising a refractory metal face plate and a series of refractory metal plates joined edge to edge and connected to both lateral marginal portions of the said face plate so as to permit relative movement of said plates and adjustment of the combustion chamber at any time as well as removal of the chamber as an unmutilated unit from the heating plant.

8. A heating plant combustion chamber adapted to withstand high combustion temperatures, comprising a series of refractory metal plates so connected edge to edge by hinge joints as to permit relative movement of said plates after assembly and adjustment of the chamber at any time as well as removal of the chamber as an unmutilated unit from a heating plant.

9. A heating plant combustion chamber adapted to withstand high combustion temperatures, comprising sections made of refractory metal, means for so joining the said sections for independent movement relatively to each other as to permit adjustment of the chamber at any time outside and inside of a heating plant as well as removal of the chamber as an unmutilated unit from the heating plant, and a baffle plate secured to the upper ends of the said sections.

10. A refractory member for a heating plant, comprising flanged refractory metal plates provided with slots in the flanged portions, the flanged portions of two adjacent plates being held in abutting relation by screws extending through said slots and secured in place by nuts the screws and slots permitting relative movement of the plates after assembly and installation in the heating plant, and a baffle plate secured to the upper ends of certain of said plates.

11. In an oil-burning heating plant, a combustion chamber, comprising a refractory metal face plate apertured to receive the draft tube of an oil burner, flanges at each lateral edge of said face plate, a series of refractory metal plates arranged in edgewise relation and secured to the said face plate, flanges at each lateral edge of each of the said refractory metal plates, screws extending through slots provided in the abutting flanges of adjacent refractory metal plates to hold the said plates in abutting relation while permitting adjustment thereof after assembly, and a baffle plate supported on the upper ends of the said metal plates.

PAUL HENRY LAIR.